Jan. 17, 1961  D. M. KNOX  2,968,108
PICTURE DISPLAY DEVICES
Filed Oct. 27, 1959  3 Sheets-Sheet 1

INVENTOR
David M. Knox
BY
Synnestvedt & Lechner
ATTORNEYS

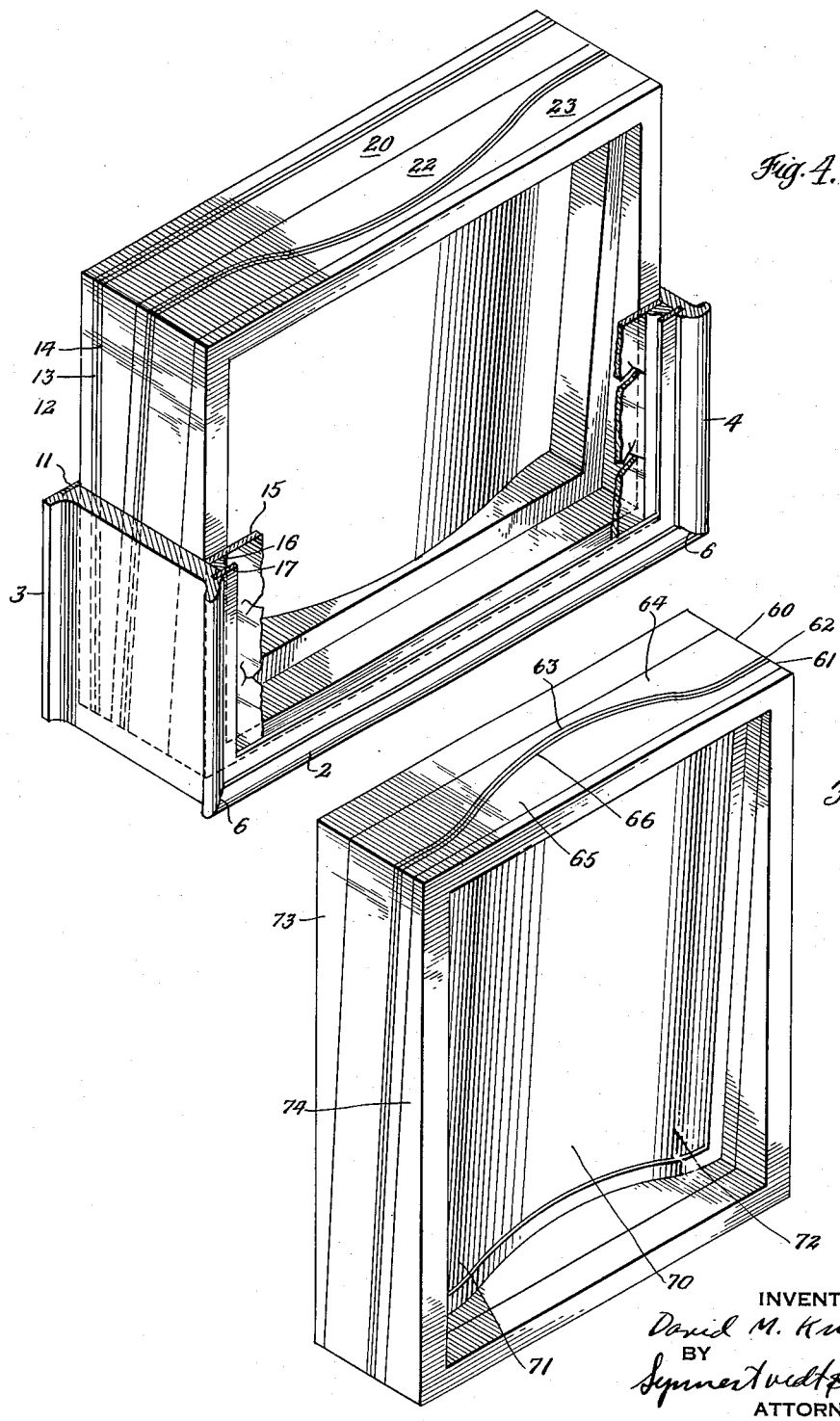

United States Patent Office 2,968,108
Patented Jan. 17, 1961

2,968,108

PICTURE DISPLAY DEVICES

David M. Knox, 310 E. 55th St., New York, N.Y.

Filed Oct. 27, 1959, Ser. No. 848,948

6 Claims. (Cl. 40—152)

This invention relates in general to display devices and in particular relates to an ensemble supporting a picture so as to have a three-dimensional effect.

By three-dimensional is meant that the picture is supported so that as viewed, it appears not only to have dimensions in length and width, but also a dimension in depth or in a direction generally along the viewing axis.

For accomplishing this three-dimensional effect, the invention in its broadest aspect contemplates mounting the picture in a frame so that the picture has a contoured surface wherein a portion of the picture is projected or retracted with respect to other portions. With all of the picture not lying in a single flat plane, the effect created is that the picture has a dimension extending along the viewing axis. This manner of displaying a picture is wholly different from the normal or conventional manner wherein the picture is held flat or all parts thereof lie in a single plane.

The three-dimensional viewing effect has several important advantages. For example, the three-dimensional effect imparts a more realistic or life-like quality to the picture. This not only enhances the aesthetic appearance of the picture, but makes the display ensemble more readily adaptable for unusual display effects and makes for more appealing use in a wide variety of decorating schemes. Many commercially available pictures are in themselves not of a quality to impart a desired three-dimensional effect and usually it is only in expensive hand-painted pictures where such effects are obtained. Thus, the present invention makes it possible to display relatively inexpensive pictures in a manner which is comparable to the viewing effect attainable only with higher priced pictures. The invention is especially advantageous for the advertising and promotional field where unusual, striking and eye-catching display can be easily and inexpensively created.

In one aspect the invention contemplates a picture ensemble having an outer frame with an aperture through which a picture is to be viewed together with means in the frame for supporting the picture including a pair of spaced curved surfaces with the picture held against the surfaces so that as seen through the aperture, the picture partakes of a three-dimenisonal effect.

In another aspect the invention contemplates a picture ensemble having an outer frame with an aperture through which the picture is to be viewed together with means in the frame for supporting a picture including a molding having spaced contoured surfaces with the picture in engagement with the surfaces so that the picture as seen through the aperture, partakes of a three-dimensional effect.

In another aspect the invention contemplates a picture ensemble having an outer frame with an aperture through which a picture is to be viewed together with a pair of moldings in the frame each having two pairs of mating contoured surfaces between which the picture is supported so that the same partakes of a contour and has a three-dimensional effect as viewed through the aperture.

The preferred construction of the invention together with certain other features, objects and advantages will be apparent from the following description and drawings wherein:

Figures 4 and 5 are isometric views illustrating how the contoured surface of the picture may be tilted or oriented with respect to the viewing axis.

Figure 1:
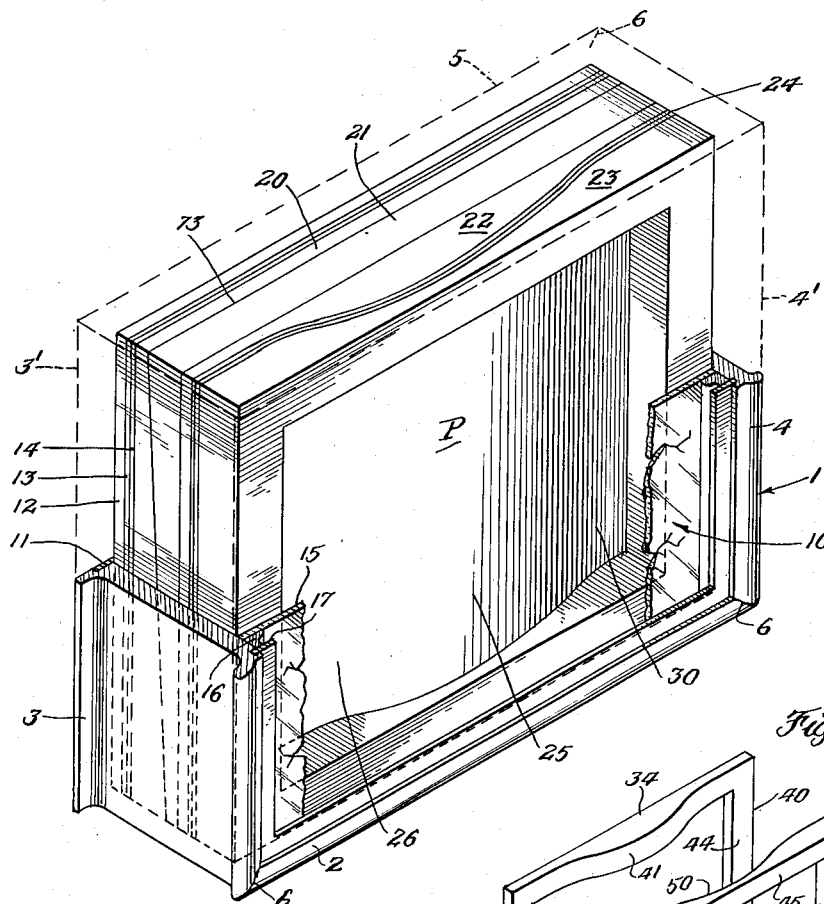
Figure 1 is an isometric view of a picture ensemble incorporating the invention, certain parts of the ensemble being removed.

In the preferred form the invention contemplates a frame or outer molding constructed as disclosed in my copending application Serial No. 792,295 and such a frame is shown (in part) in Figure 1 and comprises several molding members 2, 3 and 4. The parts of the moldings 3 and 4 above the break out point are indicated by 3' and 4' and the molding interconnecting these two is indicated at 5. The moldings are all of the same cross section and are fastened together at miter joints 6. As will be apparent, the outer molding is formed with an aperture 10 through which the picture may be viewed.

It will be noted that the frame is generally rectangular in shape with the members 2 and 5 being longer than the members 3 and 4. The ensemble may be mounted on a table with any one of the members 2, 3, 4 or 5 resting on the surface or the ensemble may be mounted on a wall and for this purpose the far side of the outer molding may be used. In either case the outer molding can be set up or supported with the long sides running vertically or horizontally.

The outer molding has a back member 11 adjacent to which is located the resilient member 12, plate 13 and mat 14. Toward the front of the frame are located the glass 15, rider 16 and stop 17. The construction and functioning of the elements 11–17 are described in detail in my copending application Serial No. 792,295. Suffice it to say here that these elements support a pair of inner moldings 20 and 21 and another pair of moldings 22 and 23 between the latter of which is located the picture assembly 24. The moldings 20 and 21 are of the type disclosed in my application filed concurrently herewith and entitled "Picture Ensemble," and as set up in Figure 1 are filler pieces for the moldings 22 and 23, but may be used for other purposes as will be explained later.

As clearly seen in Figure 1 the moldings 22 and 23 provide a support so that the picture as viewed through the aperture 10 has a contoured surface. The central part 25 of the picture projects forwardly or is closer to the viewer or observer than are the parts 26 and 30 or, conversely, the parts 26 and 30 are farther away from the viewer than the part 25. This disposition of the parts of the picture presents a three-dimensional viewing effect, that is, the picture not only has length and breadth, but in addition has a dimension which extends along the viewing axis. It will be observed that the axis of the contoured surface extends vertically.

If the picture is of a nature so that it is desirable that the center portion be farther away from the viewer, then the moldings 22 and 23 may be turned 180° from the position shown (rotated about a vertical axis), with the picture, of course, being reversed so that it will face out of the aperture.

If the picture is of a nature that the display requires the long side of the frame to extend vertically, the same may be positioned 90° from that shown in Figure 1 so that both members 2 and 5 extend vertically. In such instances the central part of the picture may be closest or farthest from the observer depending upon the orientation of the molding members 22 and 23. The axis of the contoured surface extends horizontally.

Figure 2:
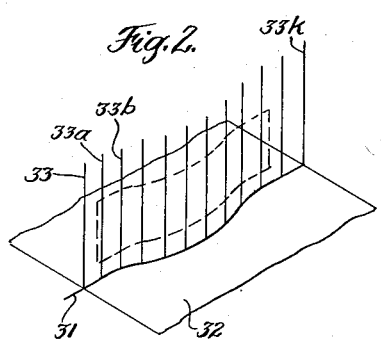
Figure 2 is an isometric diagrammatic view illustrating the generation of a contoured surface.

As mentioned above, the picture is supported so that its viewing face has a contoured surface. The exact contour may take a wide variety of forms, but preferably the invention contemplates that the contoured surface be defined as the surface generated by moving a line along a path having a desired curvature with the line remaining perpendicular to a plane containing the path. This will be explained in connection with Figure 2. Assume that the line or path 31 represents a contour line of the picture and a plane 32 contains the path 31. A line 33 perpendicular to the plane 32 moved along the path 31 to the positions 33a, 33b, etc., to 33k generates the desired contoured surface.

Figure 3:
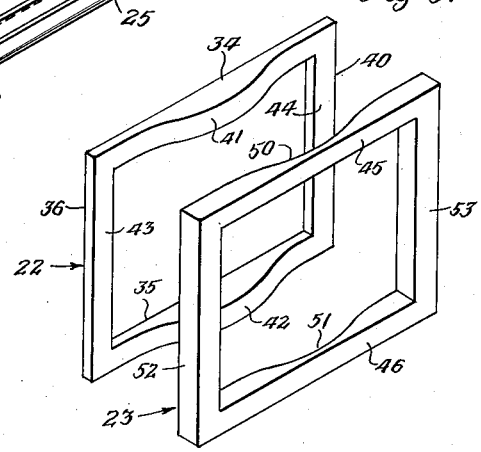
Figure 3 is an exploded isometric view reduced in size and showing certain of the moldings of Figure 1.

The moldings 22 and 23 are provided with contoured surfaces of the kind mentioned above which interengage the picture and cause the same to conform to the desired shape. In Figure 3 it will be seen that the molding 22 has long sides 34 and 35 and short sides 36 and 40. The side 34 has a contoured surface as indicated at 41 and the side 35 has a contoured surface as indicated at 42. The contoured surfaces 41 and 42 are coplanar, that is to say, are generated by the same line. The sides 36 and 40 have coplanar flat surfaces 43 and 44. The molding 23 is similarly constructed. The long sides 45 and 46 have contoured surfaces 50 and 51 (which are the inverse of the contoured surfaces 41 and 42) and the short sides 52 and 53 have planar surfaces corresponding to the planar surfaces 43 and 44. It will be apparent that when a picture or the like is supported between the contoured surfaces the plane of the picture will then conform to the desired shape.

While I have shown the contoured surfaces as being on the longer edges of the moldings, it will be perfectly apparent that the contoured surfaces may be formed on the shorter edges of the molding. In such instances the longer edges have planar surfaces similar to the surfaces 43 and 44. Such an arrangement is shown in Figure 5 wherein a pair of moldings 60 and 61 support a picture ensemble 62. The short sides of the molding 60 have contoured surfaces, one of which is indicated at 63 for the short side 64. The short side 65 of the molding 61 has a contoured surface as indicated at 66. In this arrangement it will be seen that the vertically extending portion 70 of the picture is farther from the observer than are the portions 71 and 72.

While I have shown the preferred form of the invention as comprising two moldings which support the picture ensemble therebetween, it will be apparent that the three-dimensional effect may be obtained where a single contoured molding or the like is used and the picture attached to the same by glue, staples or the like. The two molding arrangement is preferred because it lends for flexibility of display.

As mentioned above, the moldings 20 and 21 are constructed as disclosed in my copending application filed concurrently herewith and entitled "Picture Ensemble." As shown in Figure 1, these moldings abut each other along their respective bias or tapered surfaces as indicated at 73. In this position the two moldings serve simply as filler pieces. However, the moldings 22 and 23 may be supported between the moldings 20 and 21 so that the contoured surface of the picture partakes of a tilt with respect to the viewing axis. This is shown in Figures 4 and 5. In Figure 4 the long sides of the inner moldings run horizontally and the moldings 22 and 23 are supported between the moldings 20 and 21 which are arranged so that the picture has a downward tilt. In Figure 5 the long sides of the inner moldings run vertically and the moldings 60 and 61 are supported between the moldings 73 and 74 which are arranged so that the picture has a downward tilt. It will be noted that in both Figures 4 and 5 the axis of the contoured surface extends generally vertically.

It will be apparent that an ensemble may be constructed in accordance with the invention where filler pieces such as 20 and 21 are not used and only picture supporting moldings such as 22 and 23 are disposed within the aperture.

Figure 6:
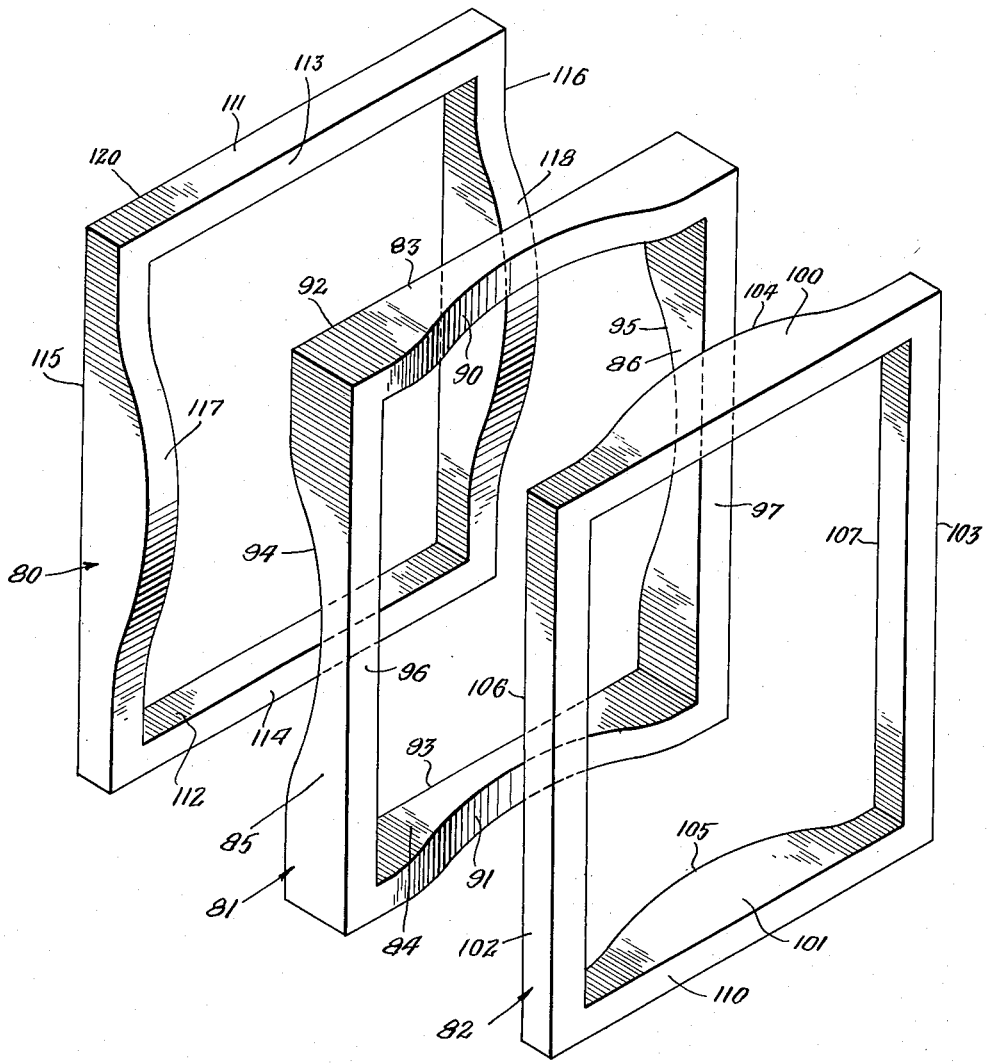
Figure 6 is an exploded isometric view of an arrangement of moldings whereby the axis of the contour may extend vertically or horizontally.

In Figure 6 I have shown an arrangement wherein the inner moldings are constructed and arranged to provide for the axis of the contoured surfaces to alternatively extend vertically or horizontally (with the outer frame in the same position) and in either case for the picture to be projected forwardly or rearwardly.

In Figure 6 the inner moldings 80, 81 and 82 are adapted to be fitted together within an outer frame similarly as described heretofore. The molding 81 has short sides 83 and 84 and long sides 85 and 86. The short sides 83 and 84 have contoured coplanar surfaces 90 and 91. The short sides 83 and 84 also have coplanar flat surfaces 92 and 93. The long sides 85 and 86 have coplanar contoured surfaces 94 and 95 and flat coplanar surfaces 96 and 97. It will be seen that the contoured surfaces 90 and 91 are at right angles to the contoured surfaces 94 and 95.

The molding 82 has short sides 100 and 101 and long sides 102 and 103. The short sides have contoured surfaces 104 and 105 which are the inverse of contoured surfaces 90 and 91. The long sides 102 and 103 have flat coplanar surfaces 106 and 107 and both the long and short sides have a flat coplanar surface 110.

The molding 80 has short sides 111 and 112 respectively provided with flat coplanar surfaces 113 and 114. The long sides 115 and 116 have contoured surfaces 117 and 118 which are the inverse of the contoured surfaces 94 and 95. Both the long and short sides are provided with a flat surface 120.

It will be observed that a picture supported between the contoured surfaces 90—91 and 104—105 will be oriented such that the central portion thereof extends rearwardly (assuming molding 80 is toward the front of the frame) and also the axis of the contour extends vertically. In order to make the contour of the picture project forwardly, it is only necessary that the three moldings be reversed 180° from the position shown (rotated about a vertical axis). If the picture is supported between the contoured surfaces 117—118 and 94—95, it will be seen that the contour of the picture extends forwardly with the axis running generally horizontally. In order to make the picture project rearwardly, the moldings may be positioned 180° from that shown, i.e., rotated about a vertical axis.

The three moldings 80, 81 and 82 may be disposed in a frame such that the longer sides extend horizontally. In such position a picture supported between the contoured surfaces 90—91 and 104—105 will have its contour axis extending horizontally and the contour may project forwardly or rearwardly depending upon the disposition of the moldings. A picture supported between the contoured surfaces 117—118 will have the contour axis extending vertically and with the contour projecting forwardly or rearwardly depending upon the disposition of the moldings.

In the foregoing I have described the outer and inner moldings as being rectangular in shape, i.e., with two opposite sides longer than the other two sides. The term "rectangular," however, is used in a generic sense, that is to say, as applying to inner and outer moldings wherein the sides are of equal length.

I claim:

1. A picture ensemble for displaying a picture so that the viewing effect is three-dimensional, the ensemble comprising: a generally rectangular-shaped frame having an aperture through which a picture is to be viewed;

a pair of moldings within said aperture and constructed to provide a first pair of facing contoured surfaces extending across one side of said frame and a second pair of facing contoured surfaces extending across the opposite side of said frame, each said surface being defined as the surface generated by moving a line along a curved path with the line remaining perpendicular to a plane containing said path; means made of opaque material supported between each pair of said surfaces and conforming to the contour thereof; and a picture on said material and partaking of its contour.

2. A picture ensemble for displaying a picture so that the viewing effect is three-dimensional, the ensemble comprising: a generally rectangular-shaped frame having an aperture through which a picture is to be viewed; an inner molding in said aperture connected with said frame, the molding having a pair of contoured surfaces respectively extending across opposite sides of the molding; means made of opaque material on said contoured surfaces and conforming to the contour thereof; means to hold said means against said surfaces, each surface being defined as the surface generated by moving a line along a curved path with the line remaining perpendicular to a plane containing said path; and a picture on said material and partaking of its contour.

3. A picture ensemble for displaying a picture so that the viewing effect is three-dimensional, the ensemble comprising: a generally rectangular-shaped outer molding having an aperture through which a picture is to be viewed; and a pair of inner moldings disposed in said aperture, each molding of the pair having a contoured surface disposed along one side thereof, and also having a contoured surface disposed along the opposite side thereof, each said surface being defined as the surface generated by moving a line along a curved path with the line remaining perpendicular to a plane containing said path.

4. A construction in accordance with claim 3 characterized by that on each one of the inner moldings the two surfaces are coplanar.

5. A picture ensemble for displaying a picture so that the viewing effect is three-dimensional, the ensemble comprising: a frame having an aperture through which a picture is to be viewed; means supporting a picture in said frame so that the picture as seen through said aperture has a contoured surface, the contoured surface being defined as the surface generated by moving a line along a curved path with the line remaining perpendicular to a plane containing said path, said means including a first pair of contoured surfaces and a second pair of contoured surfaces, the first and second pairs being generated respectively by lines oriented at right angles to each other; and mechanism to hold a picture against either of said pairs.

6. A construction in accordance with claim 5 wherein said mechanism comprises a molding.

References Cited in the file of this patent

UNITED STATES PATENTS

| | | |
|---|---|---|
| 2,498,855 | Hutt | Feb. 28, 1950 |
| 2,589,517 | Stelzer | Mar. 18, 1952 |
| 2,731,749 | Tarzian | Jan. 24, 1956 |

FOREIGN PATENTS

| | | |
|---|---|---|
| 1,088,058 | France | Sept. 1, 1954 |